US007542904B2

(12) United States Patent
Chestnut et al.

(10) Patent No.: US 7,542,904 B2
(45) Date of Patent: Jun. 2, 2009

(54) SYSTEM AND METHOD FOR MAINTAINING A SPEECH-RECOGNITION GRAMMAR

(75) Inventors: Kevin L. Chestnut, Seattle, WA (US); Joseph B. Burton, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 636 days.

(21) Appl. No.: 11/208,366

(22) Filed: Aug. 19, 2005

(65) Prior Publication Data

US 2007/0043566 A1    Feb. 22, 2007

(51) Int. Cl.
*G10L 15/18* (2006.01)
*G10L 15/06* (2006.01)
*G10L 21/00* (2006.01)

(52) U.S. Cl. ............... 704/257; 704/244; 704/250; 704/270.1

(58) Field of Classification Search ............... None
See application file for complete search history.

(56) References Cited

U.S. PATENT DOCUMENTS

| 5,774,628 | A | 6/1998 | Hemphill ............... 395/2.64 |
| 6,119,087 | A | 9/2000 | Kuhn et al. ............... 704/270 |
| 6,173,259 | B1 * | 1/2001 | Bijl et al. ............... 704/235 |
| 6,363,348 | B1 * | 3/2002 | Besling et al. ............... 704/270.1 |
| 6,374,221 | B1 | 4/2002 | Haimi-Cohen ............... 704/256 |
| 6,424,945 | B1 | 7/2002 | Sorsa ............... 704/270.1 |
| 6,434,524 | B1 | 8/2002 | Weber ............... 704/257 |
| 6,484,136 | B1 * | 11/2002 | Kanevsky et al. ............... 704/9 |
| 6,604,077 | B2 | 8/2003 | Dragosh et al. ............... 704/270.1 |
| 6,658,414 | B2 | 12/2003 | Bryan et al. ............... 707/9 |
| 6,807,257 | B1 | 10/2004 | Kurganov ............... 379/88.22 |
| 7,194,410 | B1 * | 3/2007 | Kern et al. ............... 704/270.1 |
| 2003/0023431 | A1 * | 1/2003 | Neuberger ............... 704/231 |
| 2003/0055644 | A1 * | 3/2003 | Johnston et al. ............... 704/251 |
| 2003/0182113 | A1 * | 9/2003 | Huang ............... 704/231 |

(Continued)

FOREIGN PATENT DOCUMENTS

EP     0945851 A2     9/1999

(Continued)

OTHER PUBLICATIONS

"Notification of Transmittal of the International Search Report and the Written Opinion of the International Searching Authority, or the Declaration," in International application No. PCT/US2006/030011, dated Nov. 20, 2006, 13 pages.

(Continued)

*Primary Examiner*—David R Hudspeth
*Assistant Examiner*—Matthew J Sked
(74) *Attorney, Agent, or Firm*—Baker Botts L.L.P.

(57) ABSTRACT

A method for distributing voice-recognition grammars includes receiving match data from a first remote element. The match data includes information associated with an attempt by the remote element to match received audio information to first stored audio data. The method also includes generating a grammar entry based on the match data. The grammar entry includes second stored audio data and a word identifier associated with the second stored audio data. Additionally, the method includes transmitting the grammar entry to a second remote element.

41 Claims, 4 Drawing Sheets

U.S. PATENT DOCUMENTS

2004/0208190 A1  10/2004  Wagener .................. 370/401
2005/0102142 A1*  5/2005  Soufflet et al. .............. 704/246
2006/0095266 A1*  5/2006  McA'Nulty et al. ...... 704/270.1

FOREIGN PATENT DOCUMENTS

EP  1047046 A2  10/2000
EP  1 215653 A1  12/2000

OTHER PUBLICATIONS

X. D. Huang and K. F. Lee, "On Speaker-Independent, Speaker-Dependent, and Speaker-Adaptive Speech Recognition." *IEEE*, S13. 12, 1991, 4 pages.

* cited by examiner

SYSTEM AND METHOD FOR MAINTAINING A SPEECH-RECOGNITION GRAMMAR

TECHNICAL FIELD OF THE INVENTION

This invention relates in general to communication systems and, more specifically, to speech-recognition of commands given to a communication system.

BACKGROUND OF THE INVENTION

Automatic Speech Recognition (ASR) is used to augment or replace computer keyboards, telephone keypads, mice, and related devices to control computer applications. For example, a common application of ASR allows users to control a remote server by speaking commands through a telephone. The user may be able to request information from and/or modify a remote database by voice alone or in combination with the telephone keypad.

The effectiveness of these systems is governed by the number of distinct words they can recognize accurately. As the vocabulary associated with a particular system grows, so does recognition difficulty. Recognition accuracy is further affected by variations in pronunciation among speakers. The combination of recognized words and information about various expected pronunciations is called an ASR "grammar."

Proper names of people are especially difficult to recognize. The number of possible names is limitless and the pronunciations may vary significantly depending upon the origin of the name, the language being spoken, and the regional dialect or native language of the person speaking. For example, "Rzegocki"—of Polish origin and properly pronounced "sha-guts-ki"—is baffling to most American English-speakers. It requires an uncommon knowledge of the Polish language and rules of transliteration for Polish diacritical markings not used in English. As such, mispronunciations such as "are-ze-gockee" are common, making ASR systems significantly less effective. This problem is further compounded by global migration and commerce. A native Japanese or Hindi speaker, interacting with an American English-based ASR system would further complicate the recognition of this and other "non-native" names.

Despite this complexity, the ability to control the recording and transmission of voicemails and other aspects of the operation of modern communication systems through verbal commands greatly simplifies use. As a result, the recognition of proper names is highly desirable for phone-based and other appropriate forms communication applications. For example, addressing a voicemail message, transferring a call, retrieving contact information, or requesting an appointment all depend upon accurate recognition of the name of the person being addressed.

SUMMARY OF THE INVENTION

In accordance with the present invention, the disadvantages and problems associated with generating and maintaining speech-recognition grammars have been substantially reduced or eliminated.

In accordance with one embodiment of the present invention, a method for distributing voice-recognition grammars includes receiving match data from a first remote element. The match data includes information associated with an attempt by the remote element to match received audio information to first stored audio data. The method also includes generating a grammar entry based on the match data. The grammar entry includes second stored audio data and a word identifier associated with the second stored audio data. Additionally, the method includes transmitting the grammar entry to a second remote element.

In accordance with another embodiment of the present invention, a device for distributing voice-recognition grammars includes a memory and a processor. The memory is capable of storing processor instructions. The processor is capable of receiving match data from a first remote element. The match data includes information associated with an attempt by the remote element to match received audio information to first stored audio data. The processor is operable to generate a grammar entry based on the match data. The grammar entry includes second stored audio data and a word identifier associated with the second stored audio data. The processor is also operable to transmit the grammar entry to a second remote element.

Technical advantages of certain embodiments of the present invention include providing an effective technique for optimizing out-of-box recognition rates for speech-recognition grammars. Other technical advantages include reducing and/or eliminating the need for on-site tuning of grammars and providing a self-adapting recognition system that improves recognition rates over time.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
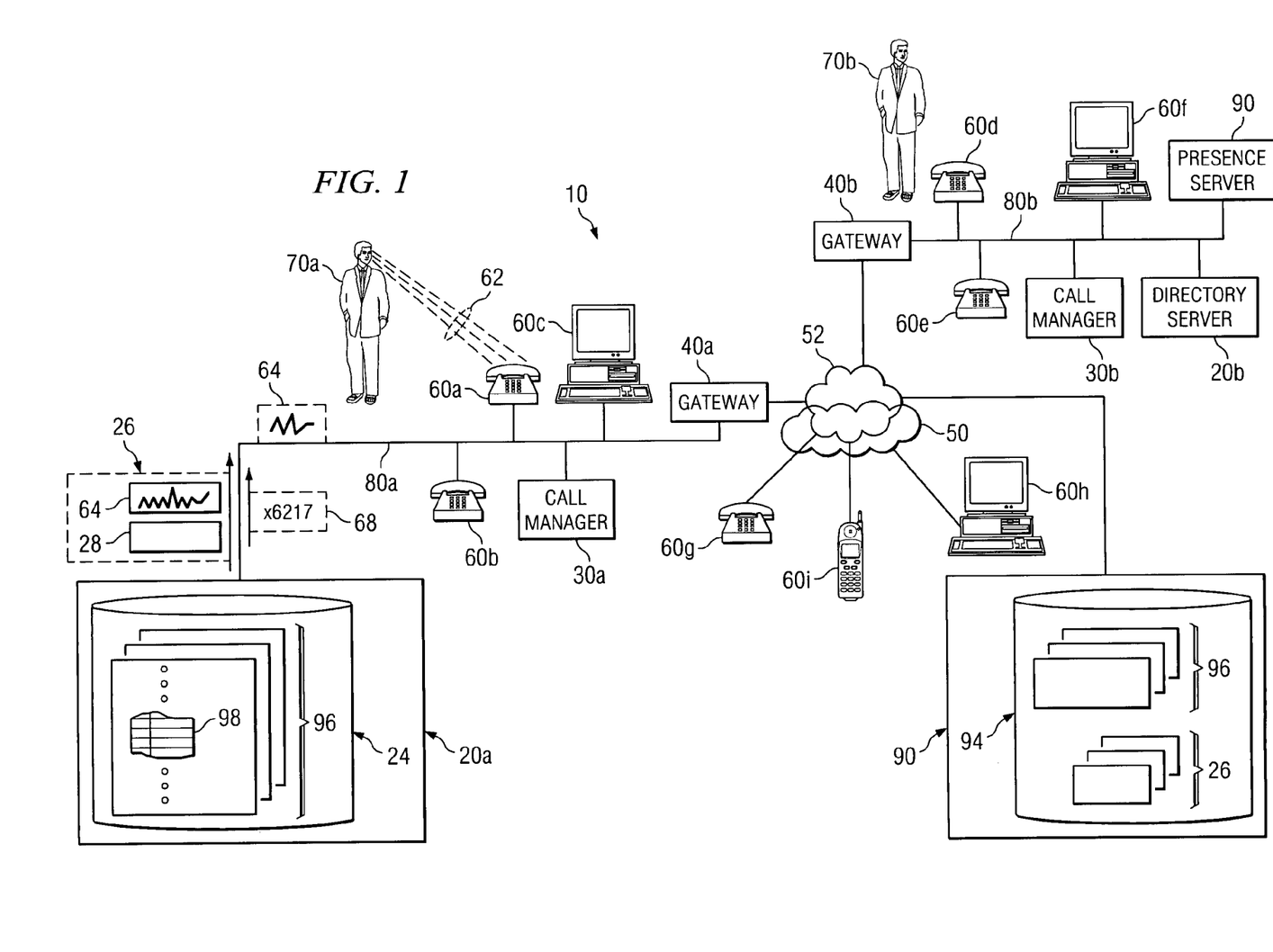
FIG. 1 illustrates a communication system according to a particular embodiment of the present invention.

FIG. 1 illustrates a particular embodiment of a communication system 10 that supports communication between users 70. As illustrated, communication system 10 includes a plurality of local area networks (LANs) 80 coupled by a Public Switched Telephone Network (PSTN) 50 and/or an Internet 52. Each LAN 80 additionally couples a plurality of communication devices 60, a directory server 20, a call manager 30, and a gateway 40 to one another and to PSTN 50 and/or Internet 52. Additionally, communication system 10 includes a grammar server 90 coupled to PSTN 50 and/or Internet 52. In particular embodiments, grammar server 90 collects voice-recognition results from several devices, such as directory servers 20, and, using these results, creates grammars tuned for specific deployment scenarios and/or optimizes existing grammars for use in particular settings. As a result, communication system 10 may reduce or eliminate the need for manual tuning as part of the deployment process for the relevant grammars.

Communication devices 60 may each represent any suitable combination of hardware, software, and/or encoded logic to provide communication services to a user. For example, communication devices 60 may represent telephones, computers running telephony software, video monitors, cameras, or any other communication hardware, software, and/or encoded logic that supports the communication of voice, video, text or other suitable forms of data using communication system 10. In the illustrated embodiment, communication devices 60*a*, 60*b*, 60*d*, and 60*e* represent Internet Protocol (IP) telephones and communication devices 60*c* and 60*f* represent telephony-enabled personal computers (PCs). Additionally, communication devices 60*g* and 60*i* represent an analog telephone and a cellphone, respectively, coupling to communication system 10 through PSTN 50. Although FIG. 1 illustrates a particular number and configuration of communication devices 60, communication system 10 contemplates any number or arrangement of such components to support communication of media.

Gateways 40 may each represent any suitable combination of hardware and/or software that performs translation functions to facilitate seamless communication between LANs 80 and PSTN 50 and/or Internet 52. These functions may include translation between transmission formats and between communications procedures. In addition, gateways 40 may also translate between audio and video CODECs and perform call setup and clearing on both the LAN side and the PSTN side. For example, gateway 40*a* may interface call manager 30*a* with PSTN 50. As a result, when a call is placed to communication device 60*a* by communication device 60*g* using PSTN 50, gateway 40*a* translates the call format associated with PSTN 50 to a call format associated with call manager 30*a*, such as, for example, SIP or another suitable packet-based communication protocol.

Call managers 30 comprise any suitable combination of hardware and/or software operable to establish a connection between a calling component of communication system 10 and a called component, such as, for example, connecting a call between communication devices 60 or between a particular communication device 60 and directory server 20. In a particular embodiment, call managers 30 comprise Voice over Internet Protocol (VoIP) servers that perform the functions of signaling and session management within a packet telephony network. The signaling functionality of call managers 30 allow call information to be carried across network boundaries. The session management functionality of call managers 30 provides the ability to control the attributes of an end-to-end call across multiple networks in communication system 10. For example, in particular embodiments, call managers 30 may support SIP, which is a standard for multimedia conferencing in IP systems. In such embodiments, call managers 30 may comprise SIP proxy servers that handle call processing, SIP requests, and SIP responses. Although the following description of call managers 30 is detailed with respect to SIP, it should be understood that call managers 30 may support other IP telephony protocols as well, such as the H.323 protocol. In particular embodiments, call managers 30 may also provide a number of telephony services for communication devices 60 and other devices located in LAN 80, including, but not limited to, call forwarding, teleconferencing, network monitoring, and CODEC translation.

LANs 80, PSTN 50, and Internet 52 provide connectivity between components coupled to them using any appropriate communication protocols. In particular embodiments, LANs 80 each represent all or a portion of an Ethernet network connecting the communication devices 60 of a particular entity, such as a company or a university. Furthermore, in particular embodiments, PSTN 50 represents all or a portion of the publicly-switched telephone network. Internet 52 provides packet-based data communication between LANs 80 and/or devices coupled directly to Internet 52. Internet 52 may also include all or a portion of the publicly-switched telephone network. Although FIG. 1 illustrates a particular embodiment of communication system 10 that includes particular types of networks, specifically LANs 80, PSTN 50, and Internet 52, that couple particular components of communication system 10, communication system 10 may include any appropriate types and numbers of networks configured in any appropriate manner.

Grammar server 90 generates, maintains, and/or disseminate grammars 96 for use by various elements of communication system 10. As used in this description and the claims that follow, a grammar 96 may include any suitable information that associates spoken utterances 62 with any appropriate form of information used by the relevant component in operation, including but not limited to, names, commands, and/or passwords. In particular embodiments, grammars 96 associate various utterances 62 with text representations of names associated with those utterances 62. In the illustrated embodiment, grammar server 90 maintains, in a memory 94 of grammar server 90, a plurality of grammars 96 to be used by one or more directory servers 20. Although the description below focuses on an embodiment of communication system 10 in which grammar server 90 is responsible for initially providing grammars 96 to appropriate elements of communication system 10, receiving information from these elements to update grammars 96, and generating revised grammars 96 for transmission to any or all of these elements, in particular embodiments, grammar server 90 may provide any or all of these functionalities, and/or any other additional functionalities related to the generation, maintenance, and dissemination of grammars 96. The contents of a particular embodiment of grammar server 90 are illustrated in greater detail below with respect to FIG. 3.

As an example of a particular type of device that may use one of the grammars 96 generated and/or updated by grammar server 90 the illustrated embodiment of communication system 10 includes a plurality of directory servers 20. Directory servers 20 provide information on telephone numbers and/or other appropriate forms of communication addresses to users 70 based on voice commands spoken by users 70. In particular embodiments, directory server 20 may represent all or a portion of a voicemail server that generates, stores, and plays voicemail messages for users 70. The contents of a particular embodiment of directory server 20 are illustrated in greater detail with respect to FIG. 2.

Each of directory servers 20 stores, in a memory 24 of that directory server 20, one or more grammars 96 for use by users 70 communicating with that directory server 20. As noted above, directory servers 20 use grammars 96 to identify names, commands, and/or other types of words spoken by users during operation of communication system 10. Directory servers 20 may obtain grammars 96 in any appropriate manner. In particular embodiments, each directory server 20 maintains one or more grammars 96 selected and/or customized for that directory server 20 based on the native language, ethnicity, location, job-type, and/or any other suitable characteristic of users 70 associated with that directory server 20. Additionally, in particular embodiments, an initial version of the appropriate grammars 96 may be loaded manually into directory servers 20 during installation or setup. In alternative embodiments, the initial version of grammars 96 may be communicated to directory servers 20 by grammar server 90. In general, however, directory servers 20 may receive the initial version of their respective grammar or grammars 96 in any appropriate manner. Directory servers 20 may then interact with grammar server 90 to obtain updated grammars 96 to provide enhanced operation of voice-command features.

In operation, directory servers 20 provide users 70 phone numbers or other communication addresses associated with other users 70 of communication system 10. As part of providing these services, directory servers 20 may accept, recognize, and/or respond to utterances 62 spoken by users 70. For example, users 70 may speak utterances 62 to specify operations, such as "lookup", that users 70 request of directory servers 20; to identify other users (such as message recipients), to directory servers 20; and/or to provide directory servers 20 with passwords and other authentication information. Although the description below focuses on embodiments of communication system 10 in which directory server 20 receives, as utterances 62, names of other users 70, users 70 may communicate any appropriate information to directory servers 20 as utterances 62. Additionally, the address-lookup services provided by directory servers 20 are described as one example of speech-recognition operation that may benefit from the grammar optimizing techniques of communication system 10. Nonetheless, particular embodiments of communication system 10 may utilize the described techniques in supporting voice-based control of any appropriate tasks including, but not limited to, addressing voice-mail messages, caller-identification during conference calls, and/or any other appropriate speech-recognition operation.

As a specific example of the voice-command operation supported in particular embodiments of communication system 10, a first user 70 (assumed here to be user 70a) attempting to initiate communication with a second user 70 (assumed here to be user 70b) may be connected to a particular directory server 20 by a call manager 30 associated with the LAN 80 in which the first user 70 is located. During the user's interaction with directory server 20a, directory server 20a may prompt user 70a to speak the name of user 70b. User 70a may then speak an utterance 62 which is received by the communication device 60 that user 70a is using to communicate with directory server 20, assumed to be communication device 60a here. Communication device 60a generates utterance information 64 that includes audio data associated with the utterance 62 spoken by user 70a and transmits utterance information 64 to directory server 20. In particular embodiments, communication device 60a generates utterance information 64 based on utterance 62 and transmits utterance information 64 to directory server 20a in one or more Voice over Internet Protocol (VoIP) packets.

Directory server 20a may then attempt to identify a phone number, an extension, and/or another suitable form of communication address 68 for the recipient by matching the received utterance information 64 to audio information stored in a particular grammar entry 98 in an appropriate grammar 96 to determine the spoken name, and then identifying a communication address 68 for that name. In particular embodiments, directory server 20a may identify the name spoken by user 70a by calculating a confidence measure for one or more grammar entries 98 in grammar 96. This confidence measure represents the probability that utterance information 64 matches audio data stored in the relevant grammar entry 98. In general, directory servers 20 may use any appropriate techniques for calculating this confidence measure.

Directory server 20a then selects the grammar entry 98 having the highest confidence measure. In particular embodiments, directory server 20a may then present, in any appropriate manner based on the configuration and capabilities of directory server 20a and/or communication device 60, a name associated with the selected grammar entry 98 to user 70a so that user 70a can confirm whether directory server 20a successfully matched the received utterance 62 to the appropriate name. For example, in particular embodiments, directory server 20a may communicate the selected name to communication device 60a causing communication device 60a to show the selected name on a display of communication device 60a. User 70a may then confirm the success or failure of the match, for example, by pressing a designated button on communication device 60a. Alternatively, directory server 20a may attempt to match utterance information 64 to a grammar entry 98 and then independently determine success or failure of the match. For example, directory server 20a may itself determine, based on whether the confidence measure calculated for the selected grammar entry 98 is higher than some predetermined minimum, if the attempted match was successful. This matching process is described in greater detail below with respect to FIG. 2.

Directory server 20a may then identify the communication address 68 associated with the matched grammar entry 98 and communicate the identified communication address 68 to communication device 60a and/or perform any other appropriate action using the identified communication address 68. As one example, directory server 20a may transmit VoIP packets to communication device 60a that specify the matched communication address 68, and user 70a may, as a result, be provided audio information identifying the relevant communication address 68. As another example, directory server 20a may automatically connect communication device 60a to the matched communication address 68 once user 70a indicates that the match was successful. In general, directory server 20a may complete any appropriate actions using the matched communication address 68.

Moreover, if directory server 20a was unsuccessful in matching utterance information 64 to a grammar entry 98, directory server 20a may perform any suitable steps to allow user 70a to communicate with the desired called party despite the directory server's failure to identify an appropriate communication address 68. For example, directory server 20a may prompt user 70a to type in the name of user 70b using a keypad associated with communication device 60a, offer a number of alternatives from which the caller can select, request that the caller repeat the name, and/or take any appropriate steps to determine the name in which user 70a is interested.

After determining whether the attempted match was successful, directory server 20a may generate and/or update match data 26 that describes any relevant aspect of the directory server's attempt to match utterance information 64 to a grammar entry 98. As one example, in particular embodiments, if directory server 20a is unable to match utterance information 64 to any grammar entry 98 maintained by directory server 20a, directory server 20a may generate match data 26 that includes utterance information 64 that directory server 20a was unable to match, as shown in FIG. 1. Such statistics may identify a particular utterance 62 that the relevant grammar 96 cannot successfully match. As another example, directory server 20a may generate match data 26 indicating the number of times that directory server 20a has received utterances 62 that were successfully matched to a particular grammar entry 98 and the number of times that directory server 20a has received utterances 62 that directory server 20a failed to match to that same grammar entry 98 (as indicated by input provided by users 70 following unsuccessful matches). Such statistics may indicate that certain words are not adequately represented by the contents of the relevant grammar 96. In general, however, directory server 20a may generate match data 26 of any suitable form that provides any appropriate information regarding voicemail server's attempt to match utterance 62 to an appropriate grammar entry 98.

Additionally, match data 26 may include information identifying the directory server 20 that generated match data 26 or otherwise describing the characteristics of that directory server 20. For example, match data 26 may include data context information 28 that describes the directory server 20 and/or users 70 associated with match data 26, as shown in FIG. 1. Data context information 28 may indicate locations, native-languages, predominant ethnicities, and/or any other suitable characteristics associated with the relevant directory server 20 and/or the users 70 who use that directory server 20.

After generating match data 26, directory server 20a communicates match data 26 to grammar server 90. In particular embodiments, directory server 20a may communicate match data 26 to grammar server 90 in real-time as match data 26 is generated. In alternative embodiments, directory server 20a may aggregate match data 26 over time and communicate match data 26 to grammar server 90 at appropriate times during operation of communication system 10. Furthermore, in particular embodiments, directory server 20a communicates match data 26 to grammar server 90 in the form of a HyperText Transfer Protocol (HTTP) response. In general, however, directory server 20a may collect match data 26 and communicate match data 26 to grammar server 90 in any appropriate manner.

Grammar server 90 receives match data 26 from one or more directory servers 20. Grammar server 90 may then collate, aggregate, and/or otherwise process received match data 26 in any appropriate manner to generate information that indicates potential improvements to one or more grammars 96 used by directory servers 20 in communication system 10. In particular embodiments, such processing may include human intervention, for example to identify potential trends or to determine appropriate modifications to make based on the identified trends. In alternative embodiments, this processing may be entirely automated.

As a result of the aggregation of match data 26 from multiple directory servers 20, the aggregation of match data 26 over time, the association of match data 26 from directory servers 20 possessing similar characteristics, and/or any other appropriate processing of match data 26, grammar server 90 and/or an operator of grammar server 90 may be able to identify commonly-occurring situations in which directory servers 20 are failing to match utterances 62 to appropriate grammar entries 98 in grammars 96. Based on this information, grammar server 90 may then generate additional grammar entries 98 and add these new grammar entries 98 to existing grammars 96 or generate new grammars 96 that include these new grammar entries 98. These new grammar entries 98 may include audio information intended to match commonly-received utterances 62 to appropriate words in a manner that is expected to improve the ability of the directory servers 20 to successfully match utterances 62 with grammar entries 98. Grammar server 90 may then add the new grammar entries 98 to a grammar 96 maintained by grammar server 90.

As a result, grammar server 90 can adapt grammars 96 to improve recognition of names that are difficult to pronounce. For example, grammar server 90 may determine based on match data 26, that users 70 frequently mispronounce the name "Rzegocki" as "ar-ze-gaw-key." Thus, grammar server 90 may generate one or more grammar entries 98 that associate audio data from the utterance "ar-ze-gaw-key" with the name "Rzegocki." As a result the relevant grammar 96 may then include both a grammar entry 96 that maps the correct pronunciation to "Rzegocki" and one that maps the mispronunciation to "Rzegocki" as well.

As another example, in particular embodiments, may identify, based on match data 26, a nickname or an abbreviated version of a particular name that directory servers 20 are frequently unable to match to the correct name. As a result, match data 26 may be able to highlight commonly-known nicknames or abbreviations that may be missing from grammars 96. For example, grammar server 90 may be able to determine based on match data 26 that one or more grammars 96 do not include any grammar entries 98 that associate audio information for the utterance "Bill" with the name "William." In response to determining this, grammar server 90 may generate one or more new grammar entries 98 that associate audio data for the utterance "Bill" with names that include "William." Furthermore, in particular embodiments of communication system 10, match data 26, in addition to highlighting commonly-known abbreviations and nicknames that are absent from grammars 96, may also teach an operator of abbreviations and nicknames utilized in languages that are foreign to the operator or that are used in region-specific dialects. For example, by aggregating and reviewing match data 26 from directory servers 20 that service large numbers of users 70 of Latino ethnicities, operator or directory server 20 itself may be able to determine that "Nacho" is a nickname for "Ignacio." Directory server 20 may as a result generate grammar entries 98 associating audio data for pronunciations of "Nacho" with names that include "Ignacio."

As yet another example, in particular embodiments of communication system 10, directory server 20 may maintain grammars for one or more native-language/spoken-language pairs. For example, grammar server 90 may maintain a customized grammar for the Japanese offices of French companies. Grammar server 90 may identify match data 26 associated with speakers using such grammars 96 and may aggregate all such match data 26. Based on this match data 26, grammar server 90 may identify mispronunciations of French names (or other types of French words) that are common among native Japanese-speakers. Grammar server 90 may then generate grammar entries 98 that associate the mispronunciations with the mispronounced names.

As noted above, grammar server 90 may add the newly-generated grammar entries 98 to grammars 96 that are already stored in memory 94 and/or may generate new grammars 96 that include the new grammar entries 98. In particular embodiments, grammar server 90 maintains multiple grammars 96, each grammar 96 intended for use in one or more directory servers 20 in communication system 10. Grammar server 90 may add the new grammar entries 98 to one or more particular grammars 96 based on characteristics of users 70 associated with the directory server 20 in which those grammars 96 will be used. As also noted above, match data 26 may, in particular embodiments, include data context information 28 that describes the directory server 20 and/or users 70 associated with match data 26. Data context information 28 may indicate a location, native-language, predominant ethnicity, and/or any other suitable characteristic associated with the relevant directory server 20 and/or the users 70 who use that directory server 20. As a result, grammar server 90 may determine one or more appropriate grammars 96 to which grammar server 90 will add the newly-created grammar entries 98 based on the data context information 28 included in match data 26.

For example, returning to the above-described example, a customized grammar 96 may be designed for use by a directory server 20 serving a Japanese office of a French company. New grammar entries 98 that are generated based on match data 26 received from directory servers 20 operated by similar companies may be added to this customized grammar 96 as a result of anticipated similarities between the speaking styles and spoken words of users 70 associated with these various directory servers 20. Thus, grammar server 90 may optimize this customized grammar 96 for use with native Japanese-speakers attempting to pronounce French names and/or native French-speakers attempting to pronounce Japanese names based on match data 26 received for directory servers 20 operating in a similar environment.

Grammar server 90 may then transmit the new or modified grammar 96 to one or more directory servers 20. In particular embodiments, grammar server 90 may select one or more directory servers 20 to send the new or modified grammar 96 based on any appropriate criteria, considerations, and/or factors. In particular embodiments, after receiving match data 26 from a first directory server 20, grammar server 90 may select one or more directory servers 20 to send a modified grammar 96 based on similarities between the first directory server 20 and the selected directory servers 20. Furthermore, in particular embodiments, grammar server 90 may select directory server 20 to receive such grammars 96 based on data context information 28 included with the relevant match data 26.

As one example, grammar server 90 may receive match data 26 from a first directory server 20 located within a particular geographic area, such as the southern states of the U.S. In response, grammar server 90 may identify a grammar 96 associated generally with directory servers 20 located within that same geographic area. After generating a modified grammar 96 based on the received match data 26 grammar server 90 may transmit the modified grammar 96 to other directory servers 20 located within that same geographic area.

As another example, grammar server 90 may receive match data 26 from a first directory server 20 that is associated with one or more languages and, in response, may identify a grammar 96 associated with those same languages. Grammar server 90 may then generate a modified grammar 96 and transmit the modified grammar 96 to one or more directory servers 20 associated with the same language or languages in question. Returning again to an earlier example, grammar server 90 may receive match data 26 from a first directory server 20 servicing a Japanese office of a French company. After generating a modified grammar 96 based on the received match data 26, grammar server 90 may transmit the modified grammar 96 to other directory servers 20 servicing French-speaking users 70, Japanese-speaking users 70, French-speaking users 70 expected to pronounce Japanese names or words, and/or Japanese users expected to pronounce French names or words.

In general, grammar server 90 may select appropriate directory servers 20 to transmit the modified or new grammar 96 based on any appropriate criteria, considerations, and/or factors. Consequently, grammar server 90 may identify modifications and/or additions to make to grammars 96 utilized by individual directory servers 20. As a result, grammar server 90 may tailor additions or modifications to the grammars 96 stored by a particular directory server 20 based on characteristics of users 70 and/or LAN 80 served by the relevant directory server 20. As a result, grammar server 90 may use match data 26 to optimize the grammar 96 maintained by each directory server 20 based on utterances 62 expected to be received by that directory server 20.

Thus, to summarize, in particular embodiments of communication system 10, grammar server 90 may, using match data 26, identify utterances 62 spoken by users 70 that directory servers 20 may have difficulty matching to appropriate grammar entries 98. Grammar server 90 may then modify one or more grammars 96 to improve the likelihood that directory servers 20 using the modified grammars 96 will correctly match the relevant utterances 62. As a result, particular embodiments of communication system 10 may optimize grammars 96 used by directory servers 20 and/or provide other operational benefits. Nonetheless, particular embodiments of communication system 10 may provide some, none, or all of the described benefits.

Figure 2:
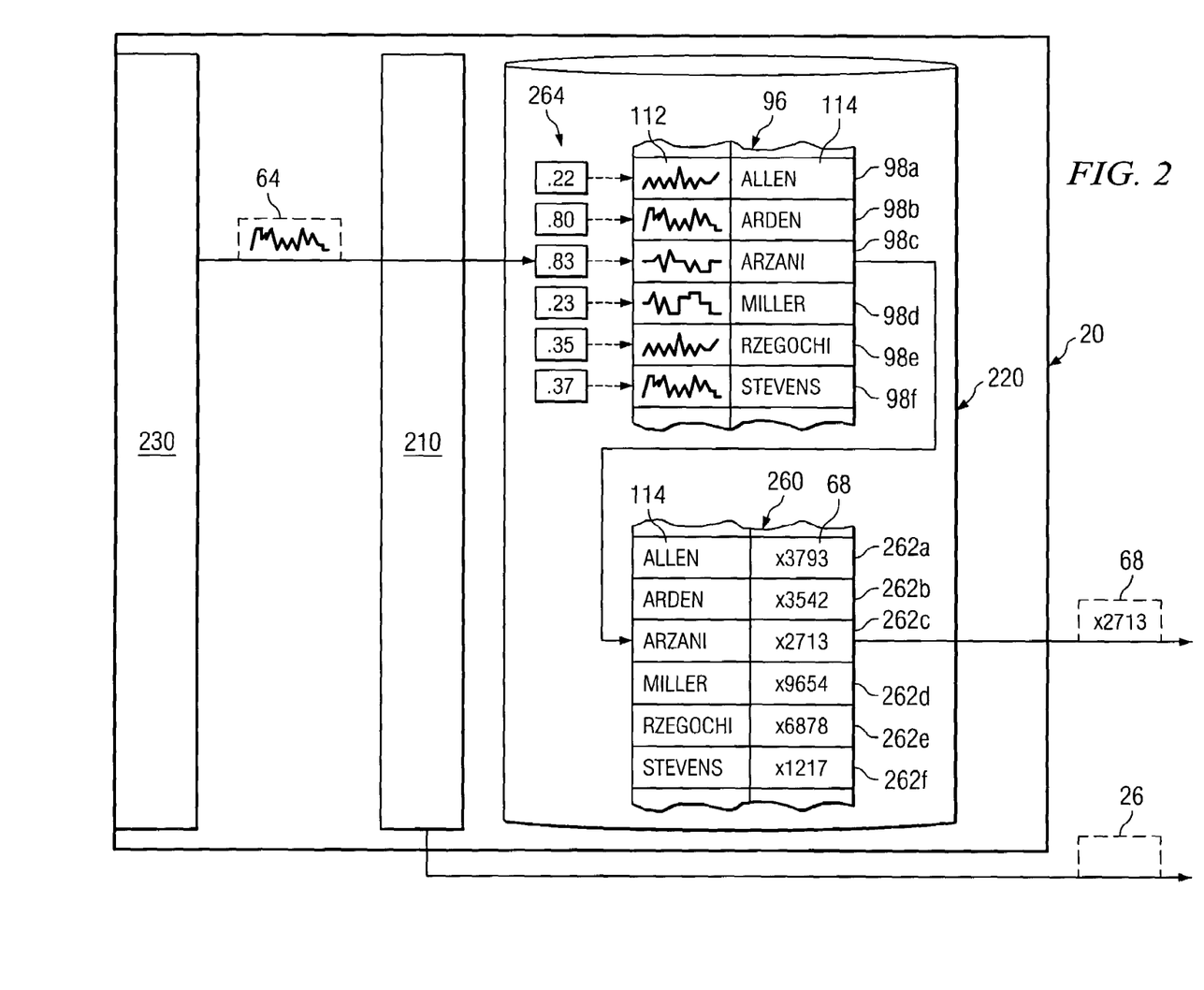
FIG. 2 illustrates a directory server that may be utilized in particular embodiments of the communication system.

FIG. 2 illustrates the contents of a particular embodiment of a directory server 20. As shown in FIG. 2, directory server 20 includes a processor 210, a memory 220, and a network interface 230. As described above, directory server 20 receives utterance information 64 from communication devices 60 of communication system 10 and attempts to match the received utterance information 64 to a grammar entry 98 in a grammar 96 stored by directory server 20. Directory server 20 then communicates to the relevant communication device 60 a communication address 68 associated with the matched grammar entry 98 in a directory 260. Additionally, directory server 20 may interact with grammar server 90 to optimize grammars 96 stored by directory server 20. Although FIG. 2 illustrates a particular example of a speech-recognition device that can be used in conjunction with grammar server 90 in particular embodiments of communication system 10, the grammar-optimizing techniques supported by grammar server 90 may be utilized to optimize grammars for any appropriate type of speech-recognition activities.

Processor 210 is operable to execute instructions associated with the services provided by directory server 20. Processor 210 may represent any suitable device capable of processing and/or communicating electronic information. Examples of processor 210 include, but are not limited to, application-specific integrated circuits (ASICs), field-programmable gate arrays (FPGAs), digital signal processors (DSPs) and any other suitable specific or general purpose processors.

Memory 220 stores processor instructions, grammars 96, directories 260, match data 26, and/or any other appropriate information used by directory server 20 in operation. Memory 220 may represent any collection and arrangement of volatile or non-volatile, local or remote devices suitable for storing data. Memory 240 may represent or include random access memory (RAM) devices, read only memory (ROM) devices, magnetic storage devices, optical storage devices, or any other suitable data storage components.

Network interface 230 comprises an interface operable to facilitate communication between directory server 20 and grammar server 90, call manager 30, communication devices 60, and/or other components of communication system 10. Network interface -230 may include any appropriate combination of hardware and/or software suitable to facilitate interaction between directory server 20 and other elements of communication system 10. In particular embodiments, network interface 230 may comprise a Network Interface Card (NIC), and any appropriate controlling logic, that is suitable to support communication between directory server 20 and the associated LAN 80 using the Ethernet or Token Ring protocol.

Grammar 96 includes a plurality of grammar entries 98. Each grammar entry associates a particular set of stored audio data 112 with a word identifier 114. Word identifiers 114 represent names, commands, parameters, and/or any other appropriate values for which directory server 20 supports speech-recognition. Word identifiers 114 may include information in any appropriate form useable by directory server 20. In particular embodiments, word identifiers 114 comprise text representations of the names of various users 70 of communication system 10. Stored audio data 112 may represent any appropriate form of audio data describing an utterance 62 associated with the relevant word identifier 114. Depending on the configuration of communication system 10, the stored audio data 112 included in each grammar entry 98 may represent audio information associated with a standard pronunciation of the word identified by the associated word identifier 114, a mispronunciation of the relevant word, a pronunciation of an abbreviation of the word, a pronunciation of a related word (e.g. a nickname), and/or any other appropriate utterance that directory server 20 is configured to map to the relevant word identifier 114.

Directory 260 includes a plurality of directory entries 262. Each directory entry 262 associates a particular word identifier 114 with a communication address 68. Communication address 68 may represent a full telephone number, extension, email address, and/or communication address of any other appropriate form. Although FIG. 2 illustrates, for purposes of simplicity, an embodiment of directory 260 in which each directory entry 262 includes a single word identifier 114 representing the last name of a particular user 70, directory entries 262 may each include multiple word identifiers 114 concatenated or combined in any appropriate manner to form a text representation of the relevant user's full name.

In operation, directory server 20 provides directory service to users 70 operating communication devices 60. As part of providing this directory service, directory server 20 receives audio data associated with utterances 62 spoken by users 70. More specifically, directory server 20 receives utterance information 64 from communication devices 60. In particular embodiments, directory server 20 communicates with communication devices 60 using the Internet Protocol (IP) and utterance information 64 may comprise portions of one or more Voice over IP (VoIP) packets. In general, however, directory server 20 and communication devices 60 may communicate using any appropriate protocols, and utterance information 64 may represent audio data structured in any suitable manner.

Upon receiving utterance information 64, directory server 20 attempts to match utterance information 64 to stored audio data 112 included in one or more grammar entries 98 in grammar 96 stored in memory 220. For the purposes of this description and the claims that follow, directory server 20 may attempt to match utterance information 64 to stored audio data 112 by performing any appropriate act, operation, and/or computation to identify a grammar entry that corresponds to the received utterance information 64. In particular embodiments, utterance information 64 and stored audio data 112 include data specifying magnitudes for various frequency components within a related audio signal. Directory server 20 may compare the magnitude of one or more frequency components within utterance information 64 with the magnitudes of the same frequency components within the stored audio data 112 of one or more of grammar entries 98. Directory server 20 may then calculate a confidence measure 264 for each grammar entry 98 based on this comparison. As noted above, confidence measure 264 represents the likelihood that utterance information 64 matches the relevant grammar entry 98.

Directory server 20 may then select a particular grammar entry 98 based, at least in part, on the confidence measure 264 calculated for that grammar entry 98. In particular embodiments, directory server 20 selects the grammar entry 98 based solely on the confidence measure 264 and, thus, selects the grammar entry 98 having the highest confidence measure 264. In the illustrated example, directory server 20 selects grammar entry 98c based on the fact that grammar entry 98c is associated with the highest confidence measure 264.

Directory server 20 may, however, consider any other appropriate factors. For example, in particular embodiments, directory server 20 may maintain data on the frequency with which particular users call other users. In such embodiments, directory server 20 may additionally consider this frequency-of-use data in selecting a grammar entry 98, giving the frequency-of-use data any appropriate weight in the selection. As a result, in such embodiments, a first grammar entry 98 may, under certain circumstances, be selected instead of a second grammar entry 98 with a higher confidence measure, based on the fact that the first grammar entry 98 is associated with the name of another party the user 70 calls frequently.

Additionally, in particular embodiments, directory server 20 may maintain multiple grammars 96. As a result, directory server 20 may, prior to attempting the match, select an appropriate grammar 96 for matching utterance information 64. For example, directory server 20 may determine based on a profile for user 70, that user 70 is a native Spanish-speaker and may select a particular grammar based on this fact. In general, directory server 20 may select an appropriate grammar 96 based on any appropriate criteria, considerations, and/or factors.

In particular embodiments, user 70 may then indicate to directory server 20 whether directory server 20 successfully matched utterance information 64 to an appropriate grammar entry. For example, directory server 20 may transmit word identifier 114 from the selected grammar entry 98 to the relevant communication device 60. Communication device 60 may then display the selected word identifier 114 on a display of communication device 60. User 70 may then indicate, for example by pressing appropriate buttons of communication device 60, whether directory server 20 has successfully matched utterance information 64 to an appropriate grammar entry 98.

If user 70 indicates that directory server 20 successfully matched the utterance information 64 to an appropriate grammar entry 98, directory server 20 proceeds to lookup a communication address 68 associated with the word identifier 114 included in the selected grammar entry 98. In the illustrated embodiment, directory server 20 performs this lookup by matching the relevant word identifier 114 to a word identifier 114 in a particular directory entry 262 in directory 260. Thus, in the illustrated example, the selected word identifier 114 matches directory entry 262c.

After identifying a matching directory entry 262, directory server 20 may communicate to the relevant communication device 60 the communication address 68 included in the matched directory entry 262, as shown in FIG. 2. Communication device 60 may then display the communication address 68 to user 70 or may initiate communication with another communication device 60 based on the matched communication address 68. Alternatively, directory server 20 may itself initiate communication between the calling communication device 60 and another communication device 60 associated with the matched communication address 68 and/or take any other appropriate actions based on the matched communication address 68.

If user 70 instead indicates that directory server 20 did not successfully match the utterance information 64 to an appropriate grammar entry 98, directory server 20 may take any suitable steps to identify an appropriate communication address 68 to provide user 70. For example, directory server 20 may communicate to the relevant communication device 60 the word identifier 114 associated with the grammar entry 98 having the next highest confidence measure 264. Communication device 60 may display the word identifier 114 to user 70 and prompt user 70 to indicate whether this second word identifier 114 is an appropriate match for the utterance 62 spoken by user 70. Directory server 20 may repeat this process until user 70 indicates that directory server 20 has selected an appropriate grammar entry 98. Directory server 20 may then attempt to match the appropriate word identifier 114 to a directory entry 262, as described above. Alternatively, directory server 20 may, in response to user 70 indicating that directory server 20 failed to match the utterance information 64 to an appropriate grammar entry 98, abort the matching process without identifying any communication address 68 for user 70.

Furthermore, after matching or attempting to match utterance information 64 to an appropriate grammar entry 98, directory server 20 may generate match data 26 describing, in any appropriate manner, directory server's attempt to match utterance information 64 to an appropriate grammar entry 98. As one example, directory server 20 may generate match data 26 for every unsuccessful attempt to match utterance information 64 to an appropriate grammar entry 98 and may include utterance information 64 and a word identifier 114 determined, based on subsequent input by user 70, to be the appropriate match for that utterance information 64. As another example, directory server 20 may generate match data 26 for all attempts, both successful and unsuccessful, and include within match data 26 the word identifier of the selected grammar entry 98 and an indication of whether the word identifier 114 was correctly selected. In general, however, match data 26 may include any appropriate information describing directory server's attempt to match the received utterance information 64 to an appropriate grammar entry 98 including, but not limited to, utterance information 64; word identifiers 114 correctly and/or incorrectly selected in attempting to match utterance information 64; data context information 28 describing native-languages, ethnicities, locations, and/or other suitable characteristics associated with the relevant user 70, directory server 20, or LAN 80, and/or any other appropriate information that may be used to optimize the contents of grammar 96.

Directory server 20 may then transmit match data 26 to grammar server 90 through network interface 230. Directory server 20 may transmit match data 26 to grammar server 90 in any appropriate form using any suitable communication techniques. For example, directory server 20 may communicate match data 26 to grammar server 90 as an HTTP response (e.g. in response to an HTTP request transmitted by grammar server 90) or a Simple Mail Transfer Protocol (SMTP) message. Grammar server's use of the transmitted match data 26 is described further below with respect to FIG. 3. In particular embodiments, directory server 20 may store match data 26 in memory 220 for later use, retrieval, and/or transmission.

Figure 3:
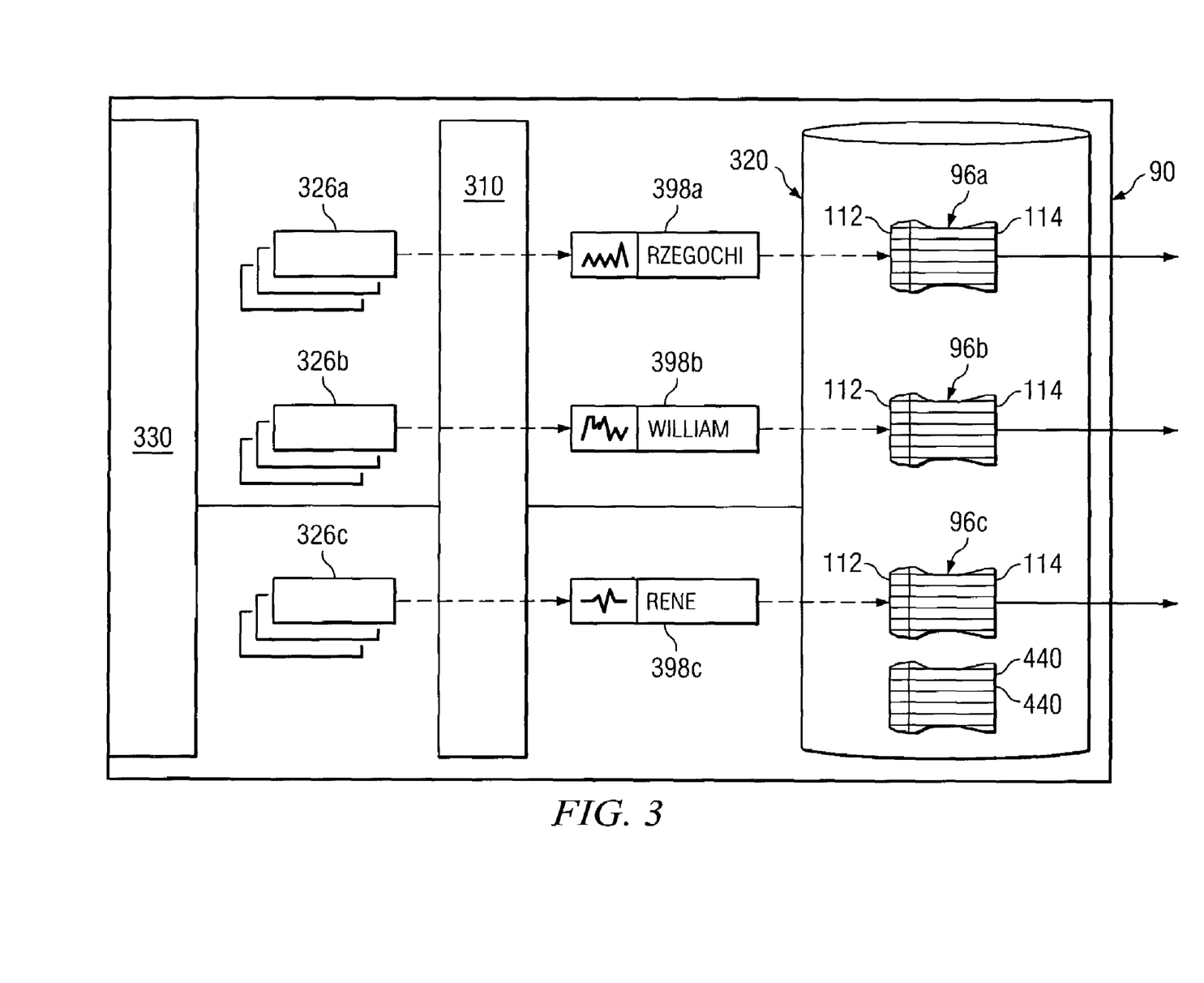
FIG. 3 illustrates a grammar server that may be utilized in particular embodiments of the communication system.

FIG. 3 illustrates a particular embodiment of grammar server 90. As shown, grammar server 90 includes a processor 310, a memory 320, and a network interface 330. As described above, grammar server 90 provides and/or updates grammars 96 for directory servers 20 or other components of communication system 10 providing voice-recognition capabilities. In particular embodiments, grammar server 90 may include user interface components (not shown in FIG. 3) to allow an operator to manually control portions of the processing of match data 26 and/or the creation of grammar entries 98. As a result, any or all of the described steps in the operation of grammar server 90 may be initiated, controlled, and/or terminated by a human operator or another component of communication system 10.

Processor 310 is operable to execute instructions associated with the services provided by directory server 20. Processor 310 may represent any suitable device capable of processing and/or communicating electronic information. Examples of processor 310 include, but are not limited to, application-specific integrated circuits (ASICs), field-programmable gate arrays (FPGAs), digital signal processors (DSPs) and any other suitable specific or general purpose processors.

Memory 320 stores processor instructions, grammars 96, match data 26, and/or any other appropriate information used by directory server 20 in operation. Memories 320 may represent any collection and arrangement of volatile or non-volatile, local or remote devices suitable for storing data. Memory 340 may represent or include random access memory (RAM) devices, read only memory (ROM) devices, magnetic storage devices, optical storage devices, or any other suitable data storage components.

Network interface 330 comprises an interface operable to facilitate communication between grammar server 90 and directory server 20, call manager 30, communication devices 60, and/or other components of communication system 10. Network interface 330 may include any appropriate combination of hardware and/or software suitable to facilitate interaction between grammar server 90 and other elements of communication system 10. In particular embodiments, network interface 330 may comprise a Network Interface Card (NIC), and any appropriate controlling logic, that is suitable to support communication between grammar server 90 and the associated LAN 80 using the Ethernet or Token Ring protocol.

In operation, grammar server 90 provides grammars 96 to directory servers 20 and/or other components of communication system 10 that provide speech-recognition services. In particular embodiments, grammar server 90 may transmit an initial grammar 96 to each directory server 20. In alternative embodiments, initial grammars 96 may instead be provided locally, for example, by having one or more grammars 96 loaded from a compact disc during initial installation of directory servers 20 and grammar server 90 may provide updated, modified, and/or new grammars 96 to directory servers 20.

After receiving an initial grammar 96, directory servers 20 begin operation and receive utterance information 64 from communication devices 60, as described above. Directory servers 20 attempt to match received utterance information 64 to grammar entries 98 in their respective initial grammars 96. Additionally, directory servers 20 generate match data 26 based in some appropriate manner on such attempts to match utterance information 64 to grammar entries 98. Directory servers 20 then transmit match data 26 to grammar server 90.

Grammar server 90 receives through network interface 330 one or more sets of match data 26 from one or more directory servers 20. Grammar server 90 may aggregate, collate, and/or otherwise process match data 26 in any suitable manner to determine appropriate changes to make to existing grammars 96 and/or to determine contents of new grammars 96 to be generated by grammar server 90 depending on the configuration and capabilities of grammar server 90, directory servers 20, and communication system 10 overall.

Grammar server 90 may then generate one or more new grammar entries 98 (shown in FIG. 3 as "new grammar entries" 398a, 398b, and 398c) based on the processed match data 26. In various embodiments, grammar server 90 may utilize match data 26 in any appropriate manner to determine whether to generate new grammar entries 98 and what the contents of these new grammar entries 98 should be. Furthermore, grammar server 90 may, after generating additional grammar entries 98, select one or more existing grammars 96 to which to add the additional grammar entries 98 and/or select other grammar entries 98 to include in a new grammar 96 that will contain these additional grammar entries 98. In particular embodiments, grammar server 90 may receive data context information 28 with match data 26 and may make either determination based on the data context information 28 received with the relevant match data 26.

As one example, in particular embodiments of communication system 10, grammar server 90 may receive multiple sets of match data 26 from one or more directory servers 20 and may aggregate this match data 26, as illustrated by "aggregated match data 326a" in FIG. 3. Based on aggregated match data 26a, grammar server 90 may identify mispronunciations common to all or a particular subset of users 70 and/or directory servers 20. Grammar server 90 may then generate a new grammar entry 98 that associates the stored audio data 112 for the common mispronunciation with the word identifier 114 for the intended name. As a result, grammar server 90 can adapt grammars 96 to improve recognition of names that are difficult to pronounce. For example, grammar server 90 may determine based on aggregated match data 326a, that users 70 frequently mispronounce the name "Rzegocki" as "ar-ze-gaw-key." Thus, grammar server 90 may generate a grammar entry 98, shown as "new grammar entry 398a," that associates stored audio data 112 for the utterance "ar-ze-gaw-key" with the word identifier 114 for "Rzegocki." Grammar server 90 may then identify one or more appropriate grammars 96 and add new grammar entry 398a to the identified grammar 96 or grammars 96. For example, grammar server 90 may decide to add new grammar entry 398a to all grammars 96 stored by grammar server 90, to all grammars 96 currently having grammar entries 98 containing the correct pronunciation of "Rzegocki," or any other appropriate subset of grammars 96 maintained by grammar server 90.

As another example, in particular embodiments, grammar server 90 may identify, based on match data 26, a nickname that is associated with a particular name or an abbreviated version of a particular name that directory servers 20 are frequently unable to match to the correct name. As a result, match data 26 may be able to highlight commonly-known nicknames or abbreviations that may be missing from grammars 96. For example, grammar server 90 may be able to determine based on match data 26 that one or more grammars 96, such as grammar 96b, do not include any grammar entries 98 that associate stored audio data 112 for "Bill" with the word identifier 114 for "William." In response to determining this, grammar server 90 may generate one or more new grammar entries 98, illustrated in FIG. 3 as new grammar entry 398b, that associate stored audio data 112 for the utterance "Bill" with a word identifier 114 for "William." Grammar server 90 may then identify an appropriate grammar 96 and add new grammar entry 398b to the identified grammar 96, in this case grammar 96b.

As yet another example, in particular embodiments of communication system 10, directory server 20 may maintain grammars for one or more native-language/spoken-language pairs, such as the above-described example grammar for native Japanese-speakers attempting to pronounce French names, shown in FIG. 3 as grammar 96c. Grammar server 90 may identify, based on data context information 28 in the various sets of match data 26 received by grammar server 90, match data 26 associated with such speakers and may aggregate all such match data 26, as illustrated by aggregated match data 26c in FIG. 3. Based on aggregated match data 26c, grammar server 90 may identify mispronunciations of French names (or other types of French words) that are common among native Japanese-speakers. Grammar server 90 may then generate a grammar entry 98, illustrated in FIG. 3 by new grammar entry 398c, that associates with the mispronunciation with the word identifier 114 for the mispronounced name. Additionally, grammar server 90 may then add new grammar entry 398c to grammar 96c.

Following the addition of any new grammar entries 398 to appropriate grammars 96 and/or generating any new grammars 96 that include new grammar entries 98, grammar server 90 may identify one or more directory servers 20 to receive the new or modified grammar 96 or grammars 96. Grammar server 90 may identify the appropriate directory servers 20 to receive the new or modified grammars 96 based on the grammars 96 currently stored by these directory servers 20, languages locations, and/or speakers associated with these directory servers 20, and/or any other appropriate characteristics of the relevant directory servers 20. For example in particular embodiments, grammar server 90 maintains a server table 440 in which grammar server 90 maintains information about directory servers 20 that grammar server 90 uses to identify appropriate directory servers 20 to transmit particular grammars 96. Moreover, in such embodiments, grammar server 90 may also use server table 440 as a supplement or substitute for data context information 28 received with match data 26.

After identifying the appropriate directory servers 20, grammar server 90 transmits the new or modified grammars 96 to the identified directory servers 20. Grammar server 90 may transmit the relevant grammars 96 to the identified directory servers 20 in any appropriate format using any suitable techniques. For example, in particular embodiments, grammar server 90 may transmit the relevant grammars 96 to directory servers 20 as part of an HTTP request or as an SMTP mail message. Alternatively, grammar server 90 may, instead of transmitting the entirety of the new or modified grammar 96 transmit only the new grammar entries 98 and/or any appropriate portion of the new or modified grammar 96. As described above, the identified directory servers 20 may then store the received grammars 96 or grammar entries 98 and begin using them to match utterance information 64 received by those directory servers 20.

As a result, grammar server 90, in particular embodiments, may be capable of collecting match data 26 from several directory servers 20 or other devices supporting speech-recognition services in communication system 10 and optimizing grammars 96 utilized by such devices. In particular, grammar server 90 may be able to identify commonly-occurring mispronunciations in directory servers 20 using a particular grammar 96. Additionally, grammar server 90 may be able to identify popular nicknames or abbreviations associated with particular names listed in a particular grammar 96 and add stored audio data 112 associated with these nicknames or abbreviations to the appropriate grammars 96. In general, grammar server 90 may also be able to develop specialized grammars 96 for directory servers 20 based on users 70, locations, uses, and/or other characteristics of the relevant directory servers 20. Thus, communication system 10 may provide several benefits. Various embodiments of communication system 10 may exhibit some, none, or all of these benefits.

Figure 4:
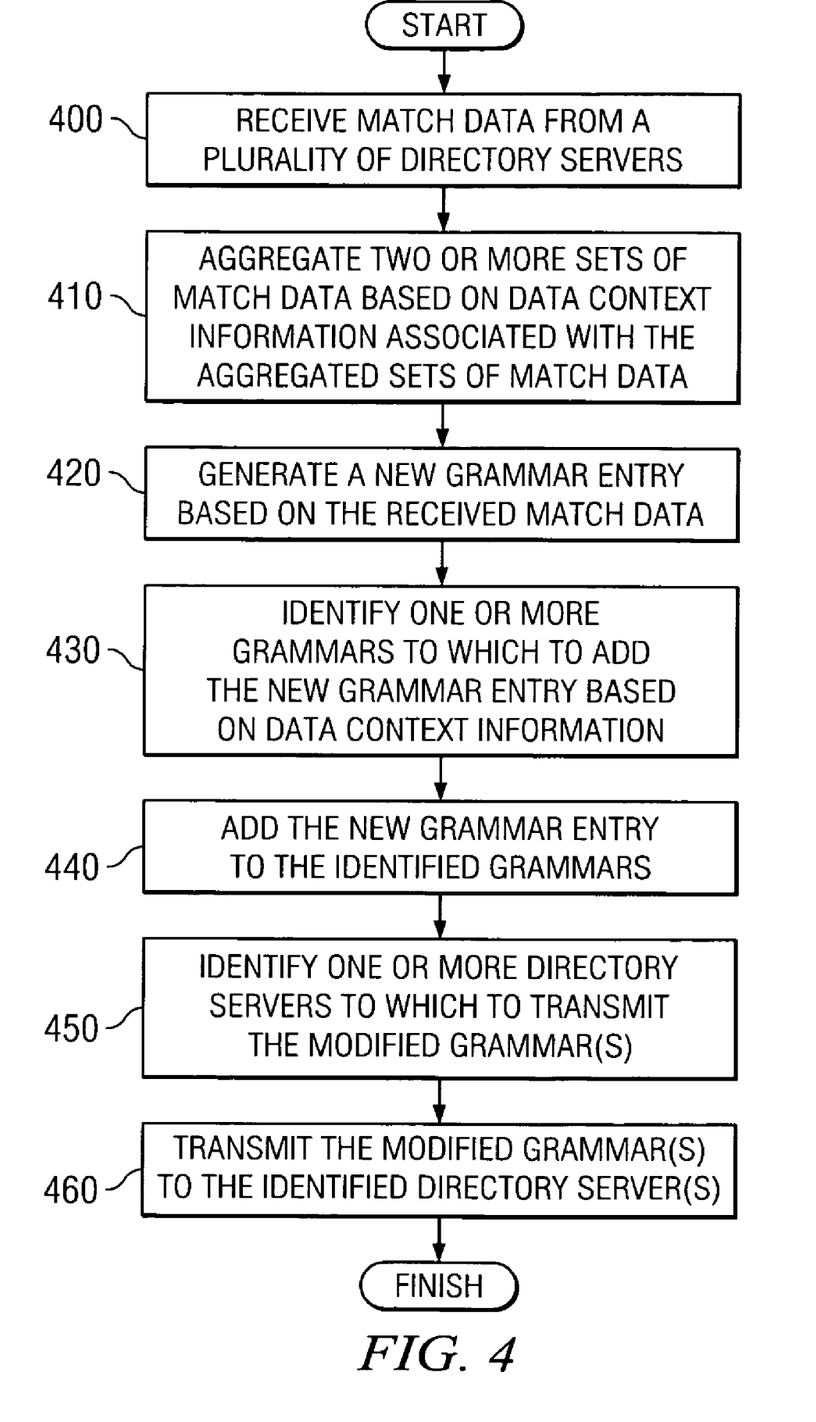
FIG. 4 is a flowchart illustrating an example operation of the communication system according to particular embodiments.

FIG. 4 is a flowchart illustrating an example operation of grammar server 90 according to particular embodiments. In particular, FIG. 4 illustrates operation of grammar server 90 in modifying grammars 96 based on match data 26 received from a plurality of directory servers 20. Although FIG. 4 illustrates operation of an embodiment of grammar server 90 that performs particular steps in a particular order, alternative embodiments may omit any of these steps or include any appropriate additional steps and may perform the illustrated steps in any appropriate order.

Operation starts begins at step 400 with grammar server 90 receiving multiple sets of match data 26 from a plurality of directory servers 20. In particular embodiments, each set of match data 26 includes utterance information 64 that the relevant directory server 20 was unsuccessful in matching, the word identifier 114 that the speaking user 70 indicated was the name the user 70 intended to lookup, and data context information 28 describing the directory server 20 that transmitted that set of match data 26. At step 410, grammar server 90 aggregates two or more sets of match data 26 based on data context information 28 associated with the aggregated sets of match data 26.

At step 420, grammar server 90 generates a new grammar entry 98 based on the received match data 26. Grammar server 90 then identifies one or more grammars 96 to which to add the new grammar entry based on data context information 28 at step 430. At step 440, grammar server 90 adds the new grammar entry 98 to the identified grammars 96.

Grammar server 90 then identifies one or more directory servers 20 to which to transmit the modified grammars 96 at step 450. At step 460, transmits the modified grammars 96 to the identified directory servers 20. In particular embodiments, operation of grammar server 90 may then end.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for distributing voice-recognition grammars, comprising:
   receiving a first set of match data from a first remote element, the first set of match data comprising information associated with an attempt by the first remote element to match first received audio information to first stored audio data;
   receiving a second set of match data from a second remote element, the second set of match data comprising information associated with an attempt by the second remote element to match second received audio information to the first stored audio data;
   aggregating the first set of match data and the second set of match data;
   deciding whether to update a grammar associated with the first stored audio data based on the aggregated match data; and
   in response to deciding to update a grammar associated with the first stored audio data:
      generating a grammar entry based on the aggregated match data, wherein the grammar entry includes second stored audio data and a word identifier associated with the second stored audio data;
      identifying, from a plurality of stored grammars, a grammar associated with the first remote element and the second remote element;
      updating the identified grammar based on the generated grammar entry; and
      transmitting the updated grammar to at least one of the first remote element and the second remote element.

2. The method of claim 1, wherein the first remote element and the second remote element comprise different remote elements.

3. The method of claim 1, wherein the word identifier identifies one or more words, and wherein the second stored audio data comprises audio data associated with a mispronunciation of one or more of the identified words.

4. The method of claim 1, wherein the word identifier identifies one or more words, and wherein the second stored audio data comprises audio data associated with an abbreviation of one or more of the identified words.

5. The method of claim 1, wherein the word identifier identifies one or more names, and wherein the second stored audio data comprises audio data associated with a nickname associated with one or more of the identified names.

6. The method of claim 1, wherein transmitting the updated grammar to at least one of the first remote element and the second remote element comprises:
   identifying a remote element from among a plurality of remote elements; and
   transmitting the updated grammar to the identified remote element.

7. The method of claim 6, wherein at least one of the first set of match data and the second set of match data indicates a language, and wherein identifying the remote element from among the plurality of remote elements comprises identifying the remote element based on a language associated with the identified remote element.

8. The method of claim 6, wherein at least one of the first set of match data and the second set of match data indicates a location, and wherein identifying the remote element from among the plurality of remote elements comprises identifying the remote element based on a location associated with the identified remote element.

9. The method of claim 1, wherein aggregating the first set of match data and the second set of match data comprises:
   selecting two or more remote elements from a plurality of remote elements; and
   aggregating match data received from the selected remote elements.

10. The method of claim 1, further comprising receiving a third set of match data from the first remote element, and wherein aggregating the first set of match data and the second set of match data comprises aggregating the first set of match data, the second set of match data, and the third set of match data.

11. The method of claim 1, further comprising:
   receiving, at the first remote element, audio information associated with an utterance spoken by a user;
   comparing the received audio information to one or more grammar entries;
   generating the first match data based on a comparison of the received audio information and the first stored audio data; and
   transmitting the first match data to a grammar server.

12. The method of claim 1, further comprising identifying a plurality of remote elements associated with a first language and a second language, and wherein:
   receiving the first set of match data comprises receiving the first set of match data from a first of the identified elements; and
   receiving the second set of match data comprises receiving the second set of match data from a second of the identified elements.

13. The method of claim 12, wherein the first language comprises a native language associated with a subset of users of the plurality of remote elements and the second language comprises a spoken language associated with users of the plurality of remote elements.

14. A device for distributing voice-recognition grammars, comprising:
a memory operable to store processor instructions; and
a processor operable to:
receive a first set of match data from a first remote element, the first set of match data comprising information associated with an attempt by the first remote element to match first received audio information to first stored audio data;
receive a second set of match data from a second remote element, the second set of match data comprising information associated with an attempt by the second remote element to match second received audio information to the first stored audio data;
aggregate the first set of match data and the second set of match data;
decide whether to update a grammar associated with the first stored audio data based on the aggregated match data; and
in response to deciding to update a grammar associated with the first stored audio data:
generate a grammar entry based on the aggregrated match data, wherein the grammar entry includes second stored audio data and a word identifier associated with the second stored audio data;
identify, from a plurality of stored grammars, a grammar associated with the first remote element and the second remote element;
update the identified grammar based on the generated grammar entry; and
transmit the updated grammar to at least one of the first remote element and the second remote element.

15. The device of claim 14, wherein the first remote element and the second remote element comprise different remote elements.

16. The device of claim 14, wherein the word identifier identifies one or more words, and wherein the second stored audio data comprises audio data associated with a mispronunciation of one or more of the identified words.

17. The device of claim 14, wherein the word identifier identifies one or more words, and wherein the second stored audio data comprises audio data associated with an abbreviation of one or more of the identified words.

18. The device of claim 14, wherein the word identifier identifies one or more names, and wherein the second stored audio data comprises audio data associated with a nickname associated with one or more of the identified names.

19. The device of claim 14, wherein the processor is operable to transmit the updated grammar to at least one of the first remote element and the second remote element by:
identifying a remote element from among a plurality of remote elements; and
transmitting the updated grammar to the identified remote element.

20. The device of claim 19, wherein at least one of the first set of match data and the second set of match data indicates a language, and wherein the processor is operable to identify the remote element from among the plurality of remote elements by identifying the remote element based on a language associated with the identified remote element.

21. The device of claim 19, wherein at least one of the first set of match data and the second set of match data indicates a location, and wherein the processor is operable to identify the remote element from among the plurality of remote elements by identifying the remote element based on a location associated with the identified remote element.

22. The device of claim 14, wherein the processor is operable to aggregate the first set of match data and the second set of match data by:
selecting two or more remote elements from a plurality of remote elements; and
aggregating match data received from the two or more remote elements.

23. The device of claim 14, wherein the processor is further operable to receive a third set of match data from the first remote element, and wherein aggregating the first set of match data and the second set of match data comprises aggregating the first set of match data, the second set of match data, and the third set of match data.

24. The device of claim 14, wherein the processor is further operable to:
receive, at the first remote element, audio information associated with an utterance spoken by a user;
compare the received audio information to one or more grammar entries;
generate the first match data based on a comparison of the received audio information and the first stored audio data; and
transmit the first match data to a grammar server.

25. The device of claim 14, wherein the processor is further operable to identify a plurality of remote elements associated with a first language and a second language, and wherein the processor is operable to:
receive the first set of match data by receiving the first set of match data from a first of the identified elements; and
receive the second set of match data by receiving the second set of match data from a second of the identified elements.

26. The device of claim 25, wherein the first language comprises a native language associated with a subset of users of the plurality of remote elements and the second language comprises a spoken language associated with users of the plurality of remote elements.

27. A system for distributing voice-recognition grammars, comprising:
a first element operable to:
receive audio data associated with an utterance;
attempt to match the received audio information to stored audio data;
generate match information based on the attempt to match the received audio data to the stored audio data; and
transmit the match information to a server;
a server operable to:
receive a first set of match data from the first element, the first set of match data comprising information associated with an attempt by the first remote element to match first received audio information to first stored audio data;
receive a second set of match data from a second remote element, the second set of match data comprising information associated with an attempt by the second remote element to match second received audio information to the first stored audio data;
aggregate the first set of match data and the second set of match data;
decide whether to update a grammar associated with the first stored audio data based on the aggregated match data; and
in response to deciding to update a grammar associated with the first stored audio data:
generate a grammar entry based on the aggregated match data, wherein the grammar entry includes second stored audio data and a word identifier associated with the second stored audio data; and identifying, from a plurality of stored grammars, a grammar associated with the first remote element and the second remote element;

updating the identified grammar based on the generated grammar entry;

transmit the updated grammar to at least one of the first element and the second element; and the first element and the second element operable to receive the updated grammar from the server.

28. The system of claim 27, wherein the word identifier identifies one or more words, and wherein the second stored audio data comprises audio data associated with a mispronunciation of one or more of the identified words.

29. The system of claim 27, wherein the word identifier identifies one or more words, and wherein the second stored audio data comprises audio data associated with an abbreviation of one or more of the identified words.

30. The system of claim 27, wherein the word identifier identifies one or more names, and wherein the second stored audio data comprises audio data associated with a nickname associated with one or more of the identified names.

31. The system of claim 27, wherein the server is operable to transmit the updated grammar to at least one of the first remote element and the second remote element by:

identifying a remote element from among a plurality of remote elements; and transmitting the updated grammar to the identified remote element.

32. The system of claim 31, wherein at least one of the first set of match data and the second set of match data indicates a language, and wherein the server is operable to identify the remote element from among the plurality of remote elements by identifying the remote element based on a language associated with the identified remote element.

33. The system of claim 31, wherein at least one of the first set of match data and the second set of match data indicates a location, and wherein the server is operable to identify the remote element from among the plurality of remote elements by identifying the remote element based on a location associated with the identified remote element.

34. The system of claim 27, wherein the server is operable to aggregate the first set of match data and the second set of match data by:

selecting two or more remote elements from a plurality of remote elements; and aggregating match data received from the two or more remote elements.

35. The system of claim 27, wherein the server is further operable to receive receiving a third set of match data from the first remote element, and wherein aggregating the first set of match data and the second set of match data comprises aggregating the first set of match data, the second set of match data, and the third set of match data.

36. The system of claim 27, wherein the server is further operable to:

receive, at the first remote element, audio information associated with an utterance spoken by a user;

compare the received audio information to one or more grammar entries;

generate the first match data based on a comparison of the received audio information and the first stored audio data; and transmit the first match data to a grammar server.

37. The system of claim 27, wherein the server is further operable to identify a plurality of remote elements associated with a first language and a second language, wherein the plurality of remote elements includes the first element and the second element, and wherein the server is operable to:

receive the first set of match data from the first remote element by receiving the first set of match data from a first of the identified elements; and receive a second set of match data from the second by receiving a second set of match data from a second of the identified elements.

38. The system of claim 37, wherein the first language comprises a native language associated with a subset of users of the plurality of remote elements and the second language comprises a spoken language associated with users of the plurality of remote elements.

39. A system for distributing voice-recognition grammars, comprising:

means for receiving a first set of match data from a first remote element, the first set of match data comprising information associated with an attempt by the first remote element to match first received audio information to first stored audio data;

means for receiving a second set of match data from a second remote element, the second set of match data comprising information associated with an attempt by the second remote element to match second received audio information to the first stored audio data;

means for aggregating the first set of match data and the second set of match data;

means for deciding whether to update a grammar associated with the first stored audio data based on the aggregated match data;

means for generating a grammar entry based on the aggregated match data in response to deciding to update a grammar associated with the first stored audio data, wherein the grammar entry includes second stored audio data and a word identifier associated with the second stored audio data;

means for identifying, from a plurality of stored grammars, a grammar associated with the first remote element and the second remote element;

means for updating the identified grammar based on the generated grammar entry; and means for transmitting the updated grammar grammar entry to at least one of the first remote element and the second remote element.

40. The system of claim 39, further comprising means for identifying a plurality of remote elements associated with a first language and a second language, and wherein:

the means for receiving the first set of match data comprises means for receiving the first set of match data from a first of the identified elements; and the means for receiving the second set of match data comprises means for receiving the second set of match data from a second of the identified elements.

41. The system of claim 40, wherein the first language comprises a native language associated with a subset of users of the plurality of remote elements and the second language comprises a spoken language associated with users of the plurality of remote elements.

* * * * *